United States Patent
Iwai et al.

(10) Patent No.: US 9,363,031 B2
(45) Date of Patent: *Jun. 7, 2016

(54) COMMUNICATION APPARATUS AND REFERENCE SIGNAL RECEIVING METHOD

(71) Applicant: Panasonic Intellectual Property Corporation of America, Torrance, CA (US)

(72) Inventors: Takashi Iwai, Ishikawa (JP); Daichi Imamura, Beijing (CN); Akihiko Nishio, Osaka (JP); Yoshihiko Ogawa, Kanagawa (JP); Masaru Fukuoka, Ishikawa (JP)

(73) Assignee: SUN PATENT TRUST, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/692,391

(22) Filed: Apr. 21, 2015

(65) Prior Publication Data

US 2015/0229428 A1 Aug. 13, 2015

Related U.S. Application Data

(63) Continuation of application No. 14/294,762, filed on Jun. 3, 2014, now Pat. No. 9,048,972, which is a continuation of application No. 13/501,914, filed as application No. PCT/JP2010/006398 on Oct. 29, 2010, now Pat. No. 8,797,986.

(30) Foreign Application Priority Data

Oct. 30, 2009 (JP) ................................. 2009-250432

(51) Int. Cl.
*H04J 11/00* (2006.01)
*H04B 7/02* (2006.01)
(Continued)

(52) U.S. Cl.
CPC .......... *H04J 11/0053* (2013.01); *H04B 1/7143* (2013.01); *H04B 7/024* (2013.01);
(Continued)

(58) Field of Classification Search
CPC .... H04W 4/06; H04W 72/0406; H04B 1/713; H04B 1/707; H04B 7/02; H04B 7/024; H04B 7/026; H04B 7/028; H04B 1/7143; H04B 17/00; H04L 5/0035; H04L 5/0053; H04L 5/0048; H04L 27/261; H04L 5/0051; H04L 5/0073; H04L 5/0091; H04L 1/20; H04L 5/0007; H04L 1/0026; H04J 11/0023; H04J 11/0053; H04J 13/0062
USPC ......... 370/208, 312, 328, 329, 209, 330, 432, 370/252; 455/452.2; 375/132–137
See application file for complete search history.

(56) References Cited

U.S. PATENT DOCUMENTS 7,430,601 B2  9/2008  Ayyagari et al.
8,145,223 B2  3/2012  Guey
(Continued)

OTHER PUBLICATIONS

3GPP TS36.211 V8.7.0, "Physical Channels and Modulation (Release 8)" May 2009, subsection 5.5.1.
(Continued)

*Primary Examiner* — Edan Orgad
*Assistant Examiner* — Ivan O Latorre
(74) *Attorney, Agent, or Firm* — Pearne & Gordon LLP

(57) ABSTRACT

Provided are a wireless communication apparatus and a reference signal generating method, wherein inter-cell interference is reduced inside and outside a CoMP set. A CoMP mode setting unit (101) sets whether the terminal (100) thereof is a CoMP terminal or a Non-CoMP terminal. When the terminal (100) is set as a Non-CoMP terminal, the hopping pattern calculating unit (104) calculates a ZC sequence number to be used as the transmission timing, from among all the ZC sequence numbers that can be used within the system. When the terminal (100) is set as a CoMP terminal, the hopping pattern calculating unit (104) calculates a ZC sequence number to be used as the transmission timing, by hopping the ZC sequence numbers to be used within the CoMP set. A ZC sequence generating unit (105) generates a ZC sequence to be used as an SRS, using the calculated ZC sequence number.

20 Claims, 9 Drawing Sheets

(51) Int. Cl.
  *H04B 17/00* (2015.01)
  *H04J 13/00* (2011.01)
  *H04L 1/20* (2006.01)
  *H04L 5/00* (2006.01)
  *H04B 1/7143* (2011.01)
  *H04L 1/00* (2006.01)

(52) U.S. Cl.
  CPC ............ *H04B 17/00* (2013.01); *H04J 13/0062* (2013.01); *H04L 1/20* (2013.01); *H04L 5/0007* (2013.01); *H04L 5/0035* (2013.01); *H04L 5/0048* (2013.01); *H04L 5/0051* (2013.01); *H04L 5/0073* (2013.01); *H04L 5/0091* (2013.01); *H04L 1/0026* (2013.01)

(56) References Cited

U.S. PATENT DOCUMENTS

| | | |
|---|---|---|
| 2007/0230600 A1 | 10/2007 | Bertand et al. |
| 2008/0139237 A1 | 6/2008 | Papasakellariou |
| 2008/0233967 A1 | 9/2008 | Montojo et al. |
| 2008/0298433 A1 | 12/2008 | Tiirola et al. |
| 2010/0027471 A1 | 2/2010 | Palanki et al. |
| 2010/0034163 A1 | 2/2010 | Damnjanovic et al. |
| 2010/0142466 A1 | 6/2010 | Palanki et al. |
| 2010/0173660 A1 | 7/2010 | Liu et al. |
| 2010/0232336 A1 | 9/2010 | Choudhury et al. |
| 2010/0323712 A1 | 12/2010 | Guey et al. |
| 2012/0106473 A1 | 5/2012 | Tiirola et al. |

OTHER PUBLICATIONS

Alcatel-Lucent Shanghai Bell, Alcatel-Lucent, Uplink coordinated multi-point reception with distributed inter-cell interference suppression for LTE-A, R1-093366, 3GPP, Aug. 2009.

International Search Report for PCT/JP2010/006398 dated Feb. 1, 2011.

3GPP TS 36.211 v8.7.0 (Technical Specification), 3rd Generation Partnership Project; Technical Specification Group Radio Access Network; Evolved Universal Terrestrial Radio Access (E-UTRA); Physical Channels and Modulation (Release 8), (May 2009), 83 Pages.

Notice of Reason for Rejection for Japanese Application No. 2014-130310 dated Mar. 3, 2015.

3GPP TSG-RAN WG1 #58, R1-093720, Shenzhen, China, Aug. 24-28, 2009, Qualcomm Europe, "CoMP email summary".

"3rd Generation Partnership Project; Technical Specification Group Radio Access Network; Evolved Universal Terrestrial Radio Access (E-UTRA); Physical Channels and Modulation (Release 8)" Technical Specification, 3GPP TS 36.211 V8.8.0, Sep. 2009, Valbonne, France.

"Further consideration on enhanced SRS for CoMP/non-CoMP user group." 3GPP TSG RAN1 #58b, R1-093796, Oct. 12-16, 2009, Miyazaki, Japan.

COMMUNICATION APPARATUS AND REFERENCE SIGNAL RECEIVING METHOD

CROSS-REFERENCE TO RELATED APPLICATIONS

This application claims priority to U.S. patent application Ser. No. 14/294,762, filed Jun. 3, 2014, entitled "COMMUNICATION APPARATUS AND REFERENCE SIGNAL RECEIVING METHOD"; U.S. patent application Ser. No. 13/501,914, filed on Apr. 13, 2012, entitled "WIRELESS COMMUNICATION APPARATUS AND REFERENCE SIGNAL GENERATING METHOD"; and PCT/JP2010/006398, filed Oct. 29, 2010, the entireties of which are incorporated herein by reference.

TECHNICAL FIELD

The present invention relates to a radio communication apparatus and reference signal generation method that generates a reference signal used to estimate channel quality.

BACKGROUND ART

In an uplink of LTE-Advanced, which is improved 3GPP LTE (3rd Generation Partnership Project Long Term Evolution), a study is underway to introduce UL CoMP (Coordinated multiple point transmission and reception). CoMP is a technique aiming to improve mainly throughput of a terminal located in a cell edge, by performing transmission and reception with a terminal between a plurality of cells (base stations) in a coordinated manner.

In the case of UL CoMP, by receiving and combining a transmission signal from one terminal at a plurality of cells (base stations), reception quality is improved. At this time, within a group (hereinafter, referred to as "CoMP set") of cells performing transmission and reception in a coordinate manner, terminal scheduling is also performed in a coordinated manner among a plurality of cells forming a CoMP set, in order to reduce influence of inter-cell interference.

On the other hand, LTE uses an SRS (Sounding Reference Signal) of uplink. Here, "Sounding" is referred to estimating channel quality, and an SRS is transmitted by time-multiplexing a specific symbol with data in order to mainly estimate CQI (Channel Quality Indicator) of uplink data channel.

LTE uses a ZC (Zadoff-Chu) sequence as an SRS. The characteristic of a ZC sequence includes that CS-ZC (Cyclic Shifted-ZC) sequences generated by cyclically shifting a ZC sequence of any ZC sequence number with a longer time length than the maximum propagation delay time are ideally orthogonal (inter-code interference is zero). However, ZC sequences having different ZC sequence numbers are not orthogonal, and cross-correlation (inter-code interference) occurs at a certain level of "1/ZC sequence length". According to the above characteristic, LTE provides a ZC sequence group defining ZC sequence numbers for each transmission bandwidth available in cells, and one ZC sequence group is assigned to each cell (e.g. see Non-Patent Document 1). 30 of these ZC sequence groups are defined, and to reduce inter-cell interference, different ZC sequence groups are assigned to adjacent cells.

In order to improve reception quality in the above UL CoMP, accurate estimation of channel quality using an SRS is necessary. Therefore, at first, it is necessary to select a ZC sequence number for an SRS transmitted by a terminal to which UL CoMP is applied, that is, the terminal (hereinafter, referred to as "CoMP terminal") where transmission signals are received and combined at a plurality of cells. As this selection method, two methods (selection method 1 and selection method 2) can be considered.

Selection method 1 is a method selecting, for an SRS of a CoMP terminal, a ZC sequence assigned to a cell (hereinafter, referred to as "serving cell") that transmits control information such as scheduling information to the terminal. That is, in a serving cell of a CoMP terminal, a terminal (hereinafter, referred to as "Non-CoMP terminal") to which UL CoMP is not applied uses the same ZC sequence for an SRS as a CoMP terminal.

Selection method 2 is a method selecting, for an SRS of a CoMP terminal, a ZC sequence of a ZC sequence number different from that of a ZC sequence to be used by a Non-CoMP terminal inside a CoMP set. That is, a ZC sequence belonging to a ZC sequence group (a ZC sequence group not used inside a CoMP set, that is, a ZC sequence group used outside a CoMP set) different from ZC sequence groups assigned to cells inside a CoMP set, is used in an SRS of a CoMP terminal.

CITATION LIST

Non-Patent Literature

NPL1
3GPP TS36.211 V8.7.0.5.5.1 Generation of the reference signal sequence, "Physical Channels and Modulation (Release 8)"

SUMMARY OF INVENTION

Technical Problem

However, the above selection method 1 has a problem that strong interference occurs inside a CoMP set. This problem will be explained below in detail.

As shown in FIG. 1, when a CoMP terminal transmits one transmission signal to a plurality of cells having different distances, each cell receives the signal at different reception timing, thereby making transmission timing control at a terminal complicated. Therefore, in a certain cell, wrong transmission timing control causes reception timing of an SRS transmitted by a CoMP terminal to expand a predetermined time range, which breaks the orthogonality between CS-ZC sequences using the same ZC sequence numbers.

When reception timing of an SRS which a CoMP terminal transmits is delayed by expanding a predetermined time length, a large correlation value of reception SRS of a CoMP terminal expands a predetermined CS (Cyclic Shift) detection window and enters a CS detection window of a Non-CoMP terminal, as shown in correlation output (delay profile) of an SRS in FIG. 2.

As a result, in a CS detection window of a CoMP terminal, it is not possible to detect reception SRS of a CoMP terminal. A reception SRS correlation value of a CoMP terminal entering a CS detection window of a Non-CoMP terminal becomes a significant interference component, so that in a CS detection window of a Non-CoMP terminal, it is difficult to distinguish between an interference component and a signal component, which deteriorates the accuracy of CQI estimation.

Further, once reception timing of an SRS that a CoMP terminal transmits is delayed, an SRS of a Non-CoMP terminal is always interfered strongly by CS-ZC sequences having broken orthogonality in a CoMP terminal, until transmission timing control is updated. Therefore, in this cell, the accuracy of CQI estimation is deteriorated, causing adequate scheduling not to perform properly, and thus system throughput is deteriorated.

In the above selection method 2, there is a problem that interference increases outside CoMP set. This problem will be explained below in detail.

When a CoMP terminal uses ZC sequence numbers to be used outside a CoMP set, inter-cell interference between a Non-CoMP terminal (a conventional LTE terminal) outside a CoMP set and a CoMP terminal increases, thereby deteriorating the accuracy of CQI estimation. Since the number of ZC sequence numbers (a ZC sequence group) which a terminal can use is limited, when ZC sequence numbers outside a comp set are used, the distance to a Non-CoMP terminal in a cell using the same ZC sequence number becomes short, thereby increasing inter-cell interference (cross-correlation). FIG. 3 shows this state.

FIG. 3 shows ZC sequence numbers used in cells, when ZC sequence numbers available in a system are 1 to 19 for ease of explanation. In FIG. 3, one cell is represented in a hexagon shape and ZC sequence numbers are assigned to make cells using the same ZC sequence number to be as distant as possible from each other, in order to reduce inter-cell interference. As shown in FIG. 3, it is assumed that cells where ZC sequence numbers 1, 2, and 3 are assigned form one CoMP set and a CoMP terminal inside a CoMP set uses ZC sequence number 16 not used in the CoMP set as a ZC sequence for an SRS. In this case, since the distance to the cell using the ZC sequence number 16 outside a CoMP set becomes shorter, and the distance attenuation of an interference wave becomes smaller, thereby increasing inter-cell interference.

It is therefore an object of the present invention to provide a radio communication apparatus and reference signal generation method that reduce inter-cell interference inside and outside a CoMP set.

Solution to Problem

The radio communication apparatus of the present invention employs a configuration having: a CoMP mode setting section that sets one of a CoMP terminal to which CoMP (Coordinated Multiple Point transmission and reception) transmission and reception for performing transmission and reception among a plurality of cells in a coordinated manner, is applied, and a Non-CoMP terminal to which the CoMP transmission and reception is not applied; a hopping pattern calculation section that includes a plurality of different hopping patterns for hopping a ZC (Zadoff-Chu) sequence number to be used for a reference signal, hops the ZC sequence number by a hopping pattern according to the CoMP terminal or the Non-CoMP terminal set by the CoMP mode setting section, and calculates the ZC sequence number; and a ZC sequence generation section that generates a ZC sequence using the calculated ZC sequence number.

The reference signal generation method of the present invention: sets one of a CoMP terminal to which CoMP (Coordinated Multiple Point transmission and reception) transmission and reception for performing transmission and reception among a plurality of cells in a coordinated manner, is applied, and a Non-CoMP terminal to which the CoMP transmission and reception is not applied; includes a plurality of different hopping patterns for hopping a ZC (Zadoff-Chu) sequence number to be used as a reference signal, hops the ZC sequence number by a hopping pattern according to the set CoMP terminal or the set Non-CoMP terminal, and calculates the ZC sequence number; and generates a ZC sequence to be used for the reference signal, using the calculated ZC sequence number.

Advantageous Effects of Invention

According to the present invention, it is possible to reduce inter-cell interference inside and outside a CoMP set.

DESCRIPTION OF EMBODIMENTS

Embodiments of the present invention will be described in detail with reference to the accompanying drawings.

Embodiment 1

Figure 1:
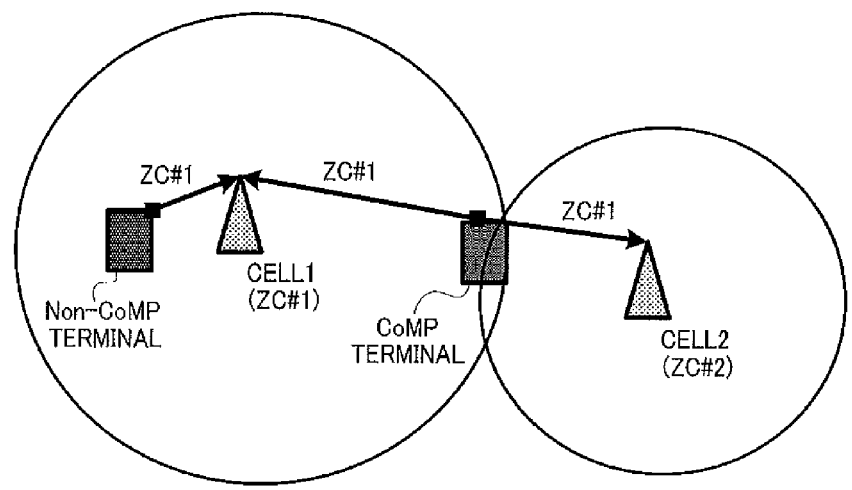
FIG. 1 shows that a transmission signal from a CoMP terminal is received at a plurality of cells having different distances.
Figure 2:
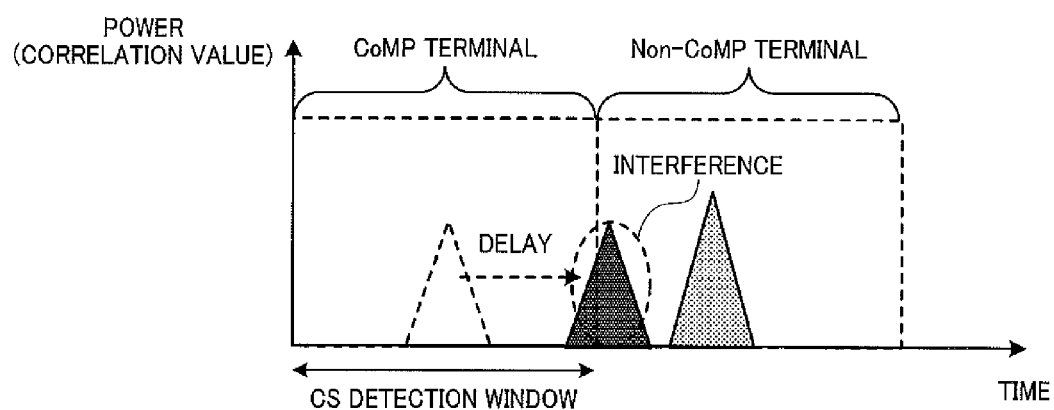
FIG. 2 shows correlation output of SRSs which a CoMP terminal and a Non-CoMP terminal transmit.
Figure 3:
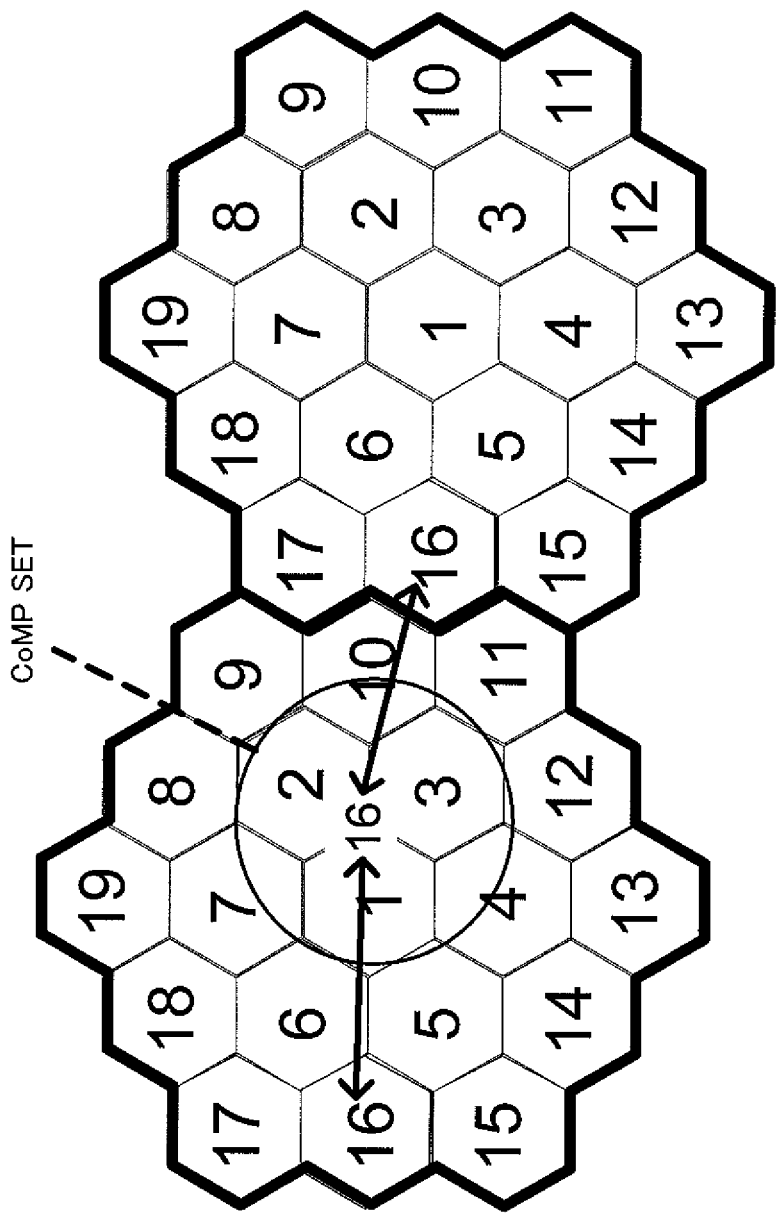
FIG. 3 shows ZC sequence numbers to be used in cells.
Figure 4:
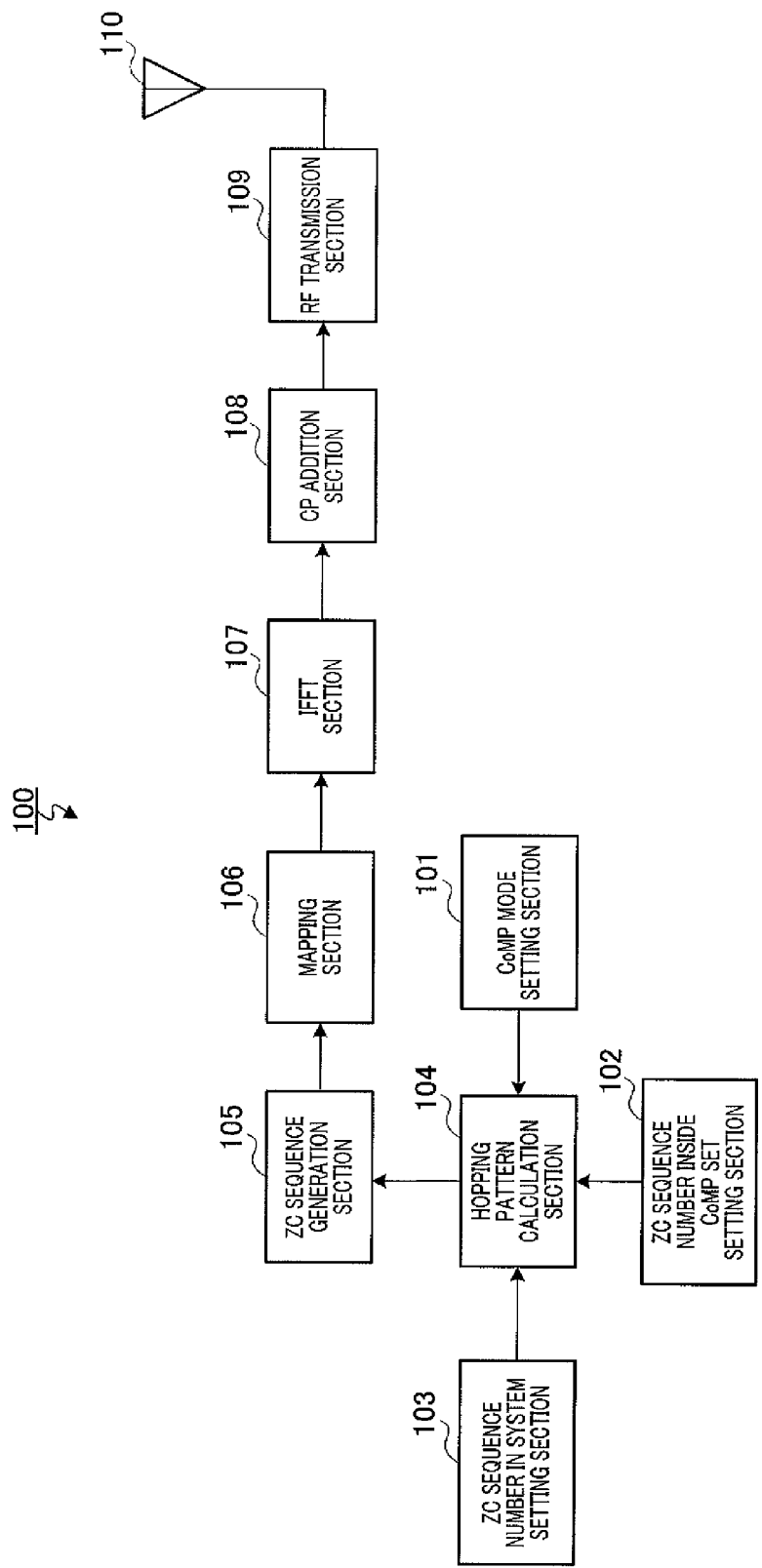
FIG. 4 is a block diagram showing a configuration of a radio communication terminal apparatus according to Embodiment 1 of the present invention.

FIG. 4 is a block diagram showing the configuration of a radio communication terminal apparatus (hereinafter, referred to as "terminal") 10 according to Embodiment 1 of the present invention. Next, a configuration of terminal 100 will be explained using FIG. 4.

CoMP mode setting section 101 sets to hopping pattern calculation section 104 a CoMP mode designated in advance by a radio communication base station apparatus (hereinafter, referred to as "base station"), that is, whether terminal 100 performs CoMP transmission and reception (CoMP terminal), or terminal 100 does not perform CoMP transmission and reception (Non-CoMP terminal).

ZC sequence number inside CoMP set setting section 102 sets ZC sequence numbers for an SRS assigned to a plurality of cells inside a CoMP set, and outputs the result to hopping pattern calculation section 104.

ZC sequence number in system setting section 103 sets all ZC sequence numbers for an SRS available in a system, and outputs the result to hopping pattern calculation section 104.

Hopping pattern calculation section 104 calculates a hopping pattern of ZC sequence numbers according to a CoMP mode set by CoMP mode setting section 101, and outputs ZC sequence numbers to be used at transmission timing to ZC sequence generation section 105, based on the calculated hopping pattern. Specifically, when terminal 100 is a CoMP terminal, a ZC sequence number which is reported from ZC sequence number inside CoMP set setting section 102 and used inside a CoMP set is hopped by the calculated hopping pattern, and therefore a ZC sequence number to be used at transmission timing is calculated. Meanwhile, when terminal 100 is a Non-CoMP terminal, all ZC sequence numbers reported from ZC sequence number in system setting section 103 and available in the system are hopped by the calculated hopping pattern, a ZC sequence number to be used at transmission timing is calculated. Also, hopping pattern calculation section 104 will be described later in detail.

ZC sequence generation section 105 generates a ZC sequence to be used as an SRS, by using a ZC sequence number output from hopping pattern calculation section 104, and outputs the result to mapping section 106.

Mapping section 106 maps a ZC sequence for an SRS output from ZC sequence generation section 105, to a transmission band of terminal 100 designated in advance by a base station, and outputs the mapped ZC sequence to IFFT (Inverse Fast Fourier Transform) section 107.

IFFT section 107 performs IFFT processing on the ZC sequence output from mapping section 106, and outputs the ZC sequence subjected to IFFT processing to CP (Cyclic Prefix) addition section 108.

CP addition section 108 adds the same signal as the end part of the signal output from IFFT section 107, to the beginning of the signal as a CP, and outputs the signal to RF (radio frequency) transmission section 109.

RF transmission section 109 performs transmission processing such as D/A conversion, up-conversion and amplification on the signal output from CP addition section 108, and transmits the signal subjected to transmission processing as an SRS via antenna 110.

Figure 5:
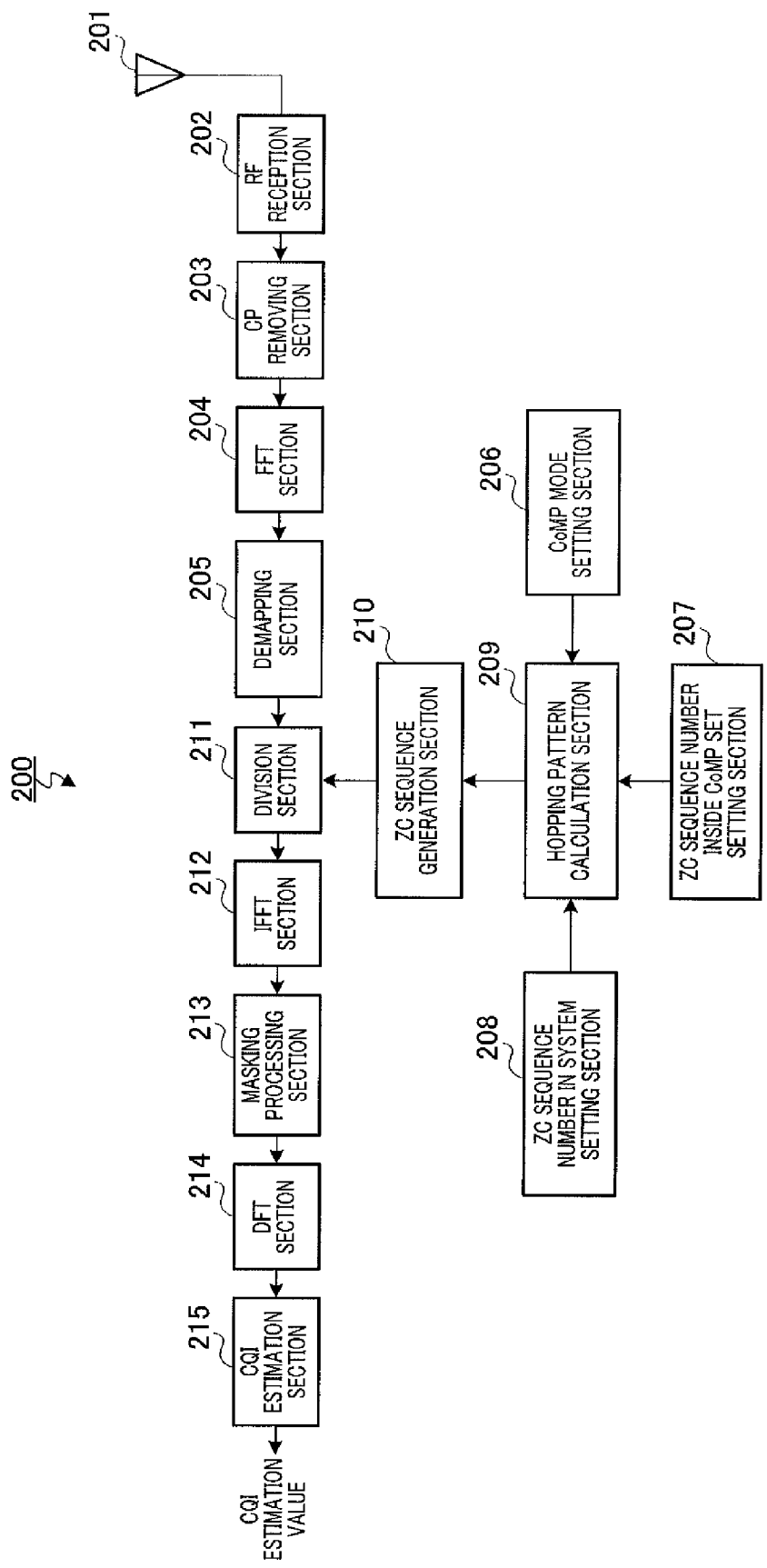
FIG. 5 is a block diagram showing a configuration of a base station according to Embodiment 1 of the present invention.

FIG. 5 is a block diagram showing the configuration of base station 200 according to Embodiment 1 of the present invention. The configuration of base station 200 is described below using FIG. 5.

RF reception section 202 applies reception processing such as down-conversion and A/D conversion to a signal received via antenna 201, and outputs the signal subjected to reception processing is applied to CP removing section 203.

CP removing section 203 removes the CP added to the top of a reception signal output from RF reception section 202, and outputs the result to FFT (Fast Fourier Transform) section 204.

FFT section 204 performs FFT processing on an SRS of time domain output from CP removing section 203, transforms the result to frequency domain signals, and outputs the transformed frequency domain to demapping section 205.

Demapping section 205 extracts an SRS corresponding to a transmission band of a desired terminal from the frequency domain SRS that is output from FFT section 204, and outputs the extracted SRS to division section 211.

CoMP mode setting section 206 sets to hopping pattern calculation section 209, a CoMP mode designated by a control section (not shown) and the like, that is, whether terminal 100 performs CoMP transmission and reception (CoMP terminal), or terminal 100 does not perform CoMP transmission and reception (Non-CoMP terminal).

ZC sequence number inside CoMP set setting section 207 sets ZC sequence numbers for an SRS assigned to a plurality of cells inside a CoMP set, and outputs the result to hopping pattern calculation section 209.

ZC sequence number in system setting section 208 sets all ZC sequence numbers for SRS available in the system, and outputs the result to hopping pattern calculation section 209.

Hopping pattern calculation section 209 calculates a hopping pattern of ZC sequence numbers according to a CoMP mode set by CoMP mode setting section 206, and outputs ZC sequence numbers to be used at reception timing of a signal transmitted from terminal 100, to ZC sequence generation section 210, based on the calculated hopping pattern. Specifically, when terminal 100 is a CoMP terminal, a ZC sequence number which is reported from ZC sequence number inside CoMP set setting section 207 and to be used inside a CoMP set is hopped by the calculated hopping pattern, and a ZC sequence number to be used at transmission timing is therefore calculated. Meanwhile, when terminal 100 is a Non-CoMP terminal, all ZC sequence numbers which are reported from ZC sequence number in system setting section 208 and available in the system are hopped by the calculated hopping pattern, a ZC sequence number to be used at transmission timing is calculated.

CoMP mode setting section 206, ZC sequence number inside CoMP set setting section 207, ZC sequence number in system setting section 208, and hopping pattern calculation section 209 correspond to and have the same function as CoMP mode setting section 101, ZC sequence number inside CoMP set setting section 102, ZC sequence number in system setting section 103, and hopping pattern calculation section 104 in terminal 100 shown in FIG. 4 respectively.

As described above, hopping pattern calculation section 209 calculates a hopping pattern according to whether terminal 100 transmitting an SRS is a CoMP terminal or a Non-CoMP terminal, and specifies a ZC sequence number at SRS transmission timing of terminal 100.

ZC sequence generation section 210 generates a ZC sequence for an SRS transmitted by terminal 100, using a ZC sequence number output from hopping pattern calculation section 209, and outputs the result to division section 211.

Division section 211 divides the SRS output from demapping section 205 by the ZC sequence for an SRS output from ZC sequence generation section 210, and outputs the divided result to IFFT section 212.

IFFT section 212 performs IFFT processing on the divided result output from division section 211, and outputs the signal subjected to IFFT processing (equivalent to a delay profile) to masking processing section 213.

Mask processing section 213 extracts the interval in which the correlation value of the desired CS-ZC sequence is present, that is, extracts the correlation value in a CS detection window, by performing mask processing on the SRS output from IFFT section 212, and outputs the extracted correlation value to DFT (Discrete Fourier Transform) section 214.

DFT section 214 performs DFT processing to the correlation values output from mask processing section 213 and outputs the correlation values subjected to DFT processing, to CQI estimation section 215. Here, the signal which is subjected to DFT processing and output from DFT section 214 represents the frequency response of the channel.

CQI estimation section 215 estimates (channel quality estimation) SINR for every predetermined bandwidth, based on a signal representing the frequency response output from DFT section 214, and outputs a CQI estimation value corresponding to the estimated SINR.

Next, the operation of hopping pattern calculation section 104 of terminal 100 shown in FIG. 4 will be described. Hopping pattern calculation section 209 of base station 200 performs the same operation as hopping pattern calculation section 104, and a detailed description therefore will be omitted.

According to whether terminal 100 is a CoMP terminal or a Non-CoMP terminal, hopping pattern calculation section 104 switches a hopping pattern of ZC sequence numbers for an SRS, and specifies a ZC sequence number for an SRS, to be used at transmission timing.

First, when terminal 100 is a Non-CoMP terminal, hopping pattern calculation section 104 calculates ZC sequence number $u_N(t)$ for an SRS of a Non-CoMP terminal as shown in equation 1, using the hopping function "hopping ( )" which is defined in the system in advance.

$$u_N(t) = \text{hopping}(u_{N\_init}+t) \quad \text{(Equation 1)}$$

Here, N represents a cell number, t represents a transmission subframe number, and $u_{N\_init}$ represents an initial value of a ZC sequence number for an SRS in cell N. By each subframe, this hopping function changes numbers among all ZC sequence numbers available in the system. However, ZC sequence number $u_N(t)$ for an SRS of a Non-CoMP terminal may be fixed without changing by one subframe.

Next, when terminal 100 is a CoMP terminal, hopping pattern calculation section 104 hops a ZC sequence number which a Non-CoMP terminal uses inside a CoMP set. For example, when a CoMP set is formed with three cells of cell 1, cell 2, and cell 3, hopping pattern calculation section 104 calculates ZC sequence number $u_{CoMP}(t)$ for an SRS of a CoMP terminal as shown in equation 2.

$$u_{CoMP}(t) = u_{((t)\text{mod}(3)+1)}(t) \quad \text{(Equation 2)}$$

In equation 2, (t)mod(3) represents the number of the remainder calculated by dividing transmission subframe number t by cell number 3. Here, it is assumed that transmission subframe number t is changed in order of t#0→t#1→t#2→t#3→t#4. In this case, ZC sequence number $u_{CoMP}(t)$ for an SRS of a CoMP terminal to be used at transmission timing of each transmission subframe is changed as $u_1(0) \to u_2(1) \to u_3(2) \to u_1(3) \to u_2(4)$ according to equation 2. The change is made among ZC sequence numbers to be used in cells #1, 2, and 3 inside a CoMP set.

Figure 6:
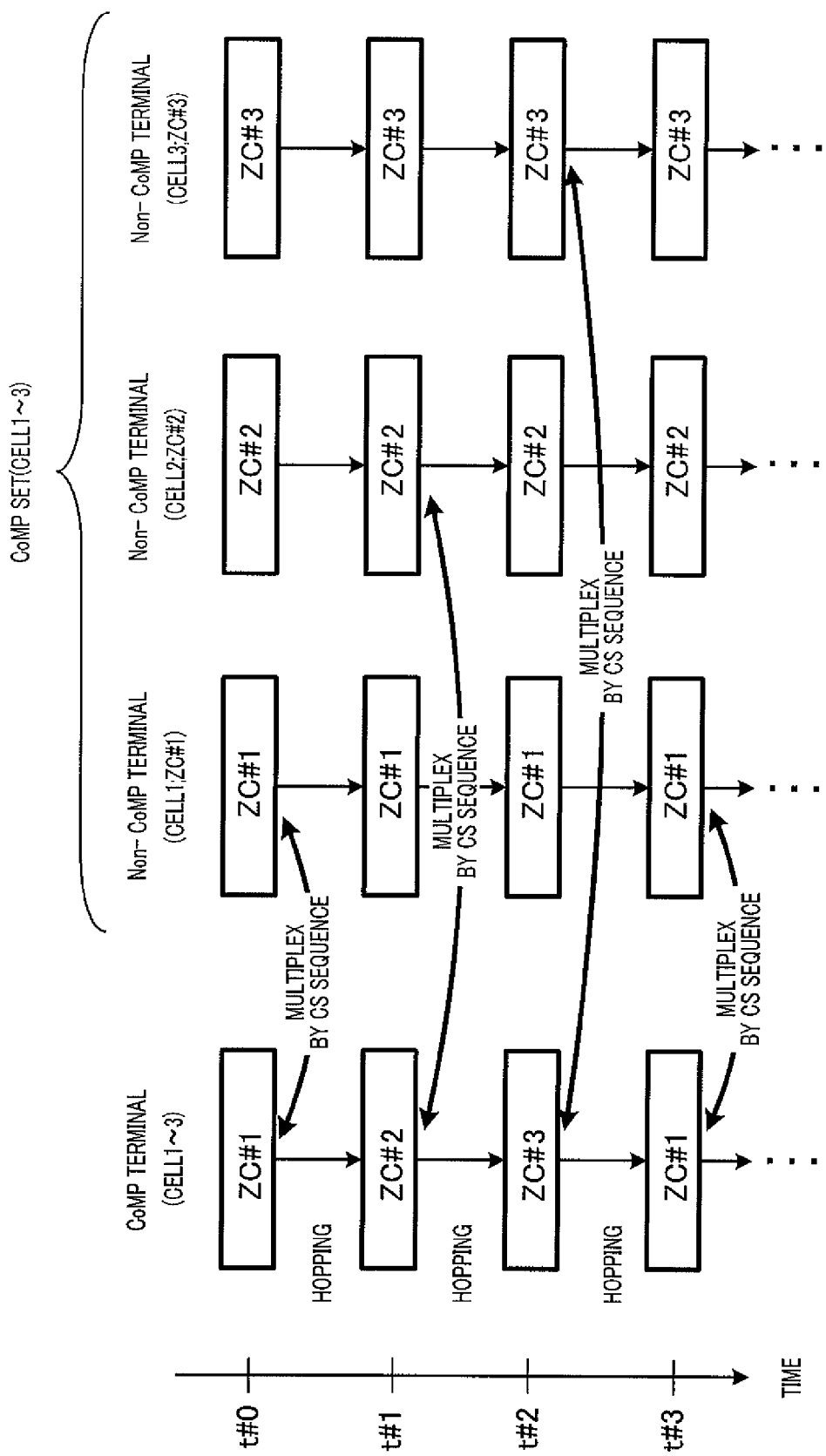
FIG. 6 shows a hopping pattern of ZC sequence numbers according to Embodiment 1 of the present invention.

FIG. 6 shows this state. In FIG. 6, ZC sequence number 1 (ZC#1) is assigned to cell 1 inside a CoMP set, ZC sequence number 2 (ZC#2) is assigned to cell 2, and ZC sequence number 3 (ZC#3) is assigned to cell 3, respectively. The ZC sequence number for an SRS of a CoMP terminal, the number to be used by transmission subframe number t at transmission timing of t#0, becomes ZC#1, and a CoMP terminal and a Non-CoMP terminal which is in cell 1 multiplex the ZC sequence of ZC#1 by different CSZC sequences.

Next, the ZC sequence number for an SRS of a CoMP terminal, the number to be used by transmission subframe number t at transmission timing of t#1, hops from ZC#1 to ZC#2, a CoMP terminal and a Non-CoMP terminal which is in cell 2 multiplex the ZC sequence of ZC#2 by different CSZC sequences.

Next, the ZC sequence number for an SRS of a CoMP terminal, the number to be used by transmission subframe number t at transmission timing of t#2, hops from ZC#2 to ZC#3, a CoMP terminal and a Non-CoMP terminal which is in cell 3 multiplex the ZC sequence of ZC#2 by different CSZC sequences.

The ZC sequence number for an SRS of a CoMP terminal, the number to be used by transmission subframe number t at a transmission timing of t#3, hops from ZC#3 to ZC#1, and thereby returns to the case where transmission subframe number t is t#0.

By hopping ZC sequence numbers used by a CoMP terminal within the range of the ZC sequence to be used inside a CoMP set, it is possible to prevent strong interference occurring when a CoMP terminal and a Non-CoMP terminal use the same ZC sequence from continuing in one cell. This is contributed by hopping ZC sequence numbers that a CoMP terminal uses and ZC sequence numbers that a Non-CoMP terminal using different hopping patterns, and by making a switching interval of ZC sequences according to hopping shorter than an updating interval of transmission timing control.

Figure 7:
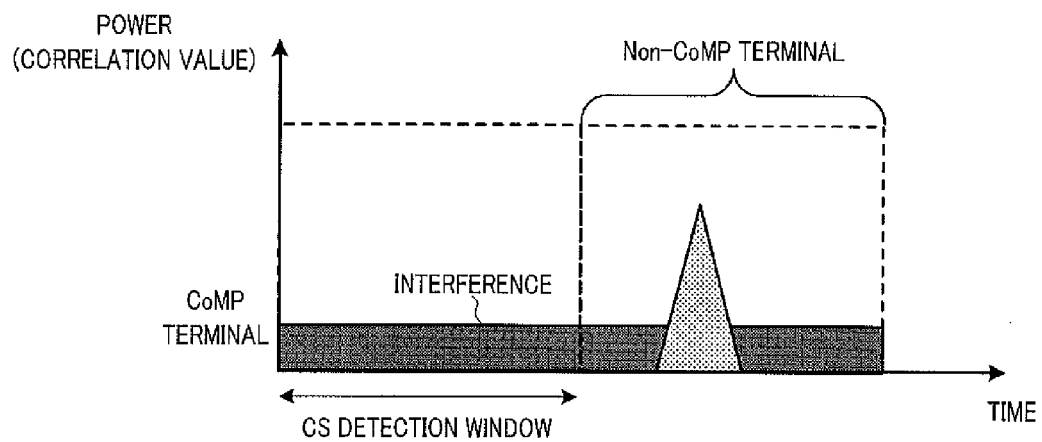
FIG. 7 shows correlation output of SRSs transmitted by a CoMP terminal and a Non-CoMP terminal according to Embodiment 1 of the present invention.

When a CoMP terminal and a Non-CoMP terminal use different ZC sequence numbers, interference components become cross-correlation at a certain level, and it is therefore possible to reduce deterioration of the accuracy of CQI estimation even if the receiving timing is delayed, as shown in FIG. 7. Also, a certain level of interference components makes it possible to perform compensation calculation at a receiver and thereby to prevent deterioration of the accuracy of CQI estimation.

Figure 8:
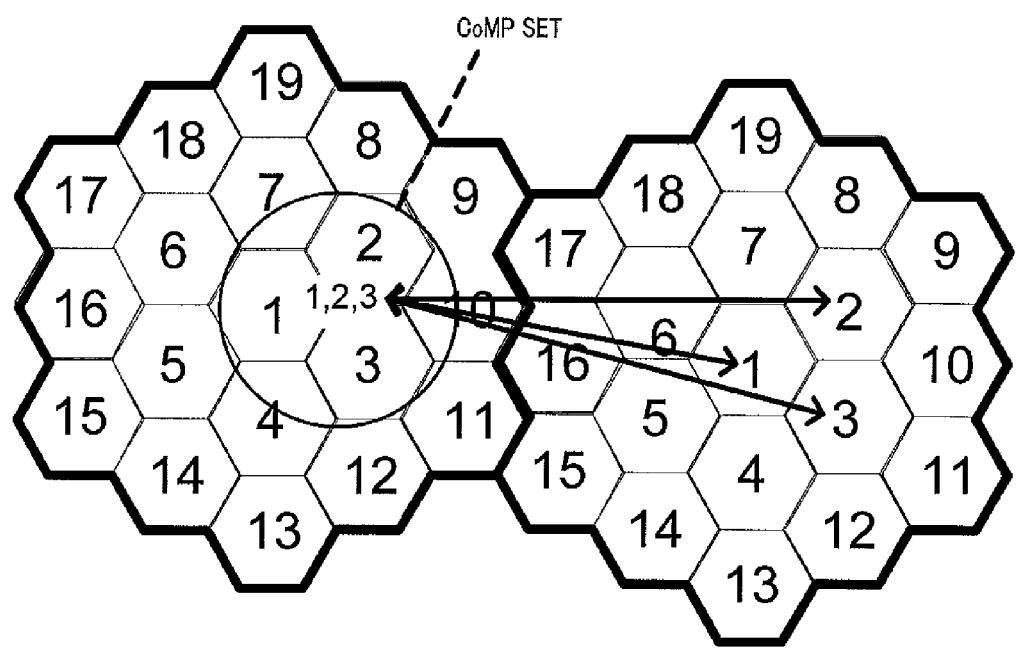
FIG. 8 shows the state able to maintain distances between cells using the same ZC sequence numbers as designed.

As shown in FIG. 8, a CoMP terminal uses a ZC sequence inside a CoMP set, thereby not providing inter-cell interference to a terminal outside a CoMP set. That is, the distance between cells using the same ZC sequence number can be maintained as designed, so that it is possible to prevent increasing of inter-cell interference between a CoMP terminal and a terminal outside a CoMP set.

Thus, according to Embodiment 1, by hopping a ZC sequence number used by a CoMP terminal within the range of the ZC sequence to be used inside a CoMP set, it is possible to prevent strong interference occurring when a CoMP terminal and a Non-CoMP terminal use the same ZC sequence, from continuing in one cell. Also, a CoMP terminal uses a ZC sequence inside a CoMP set, it is possible to prevent increasing of inter-cell interference between a CoMP terminal and a terminal outside a CoMP set.

Figure 9:
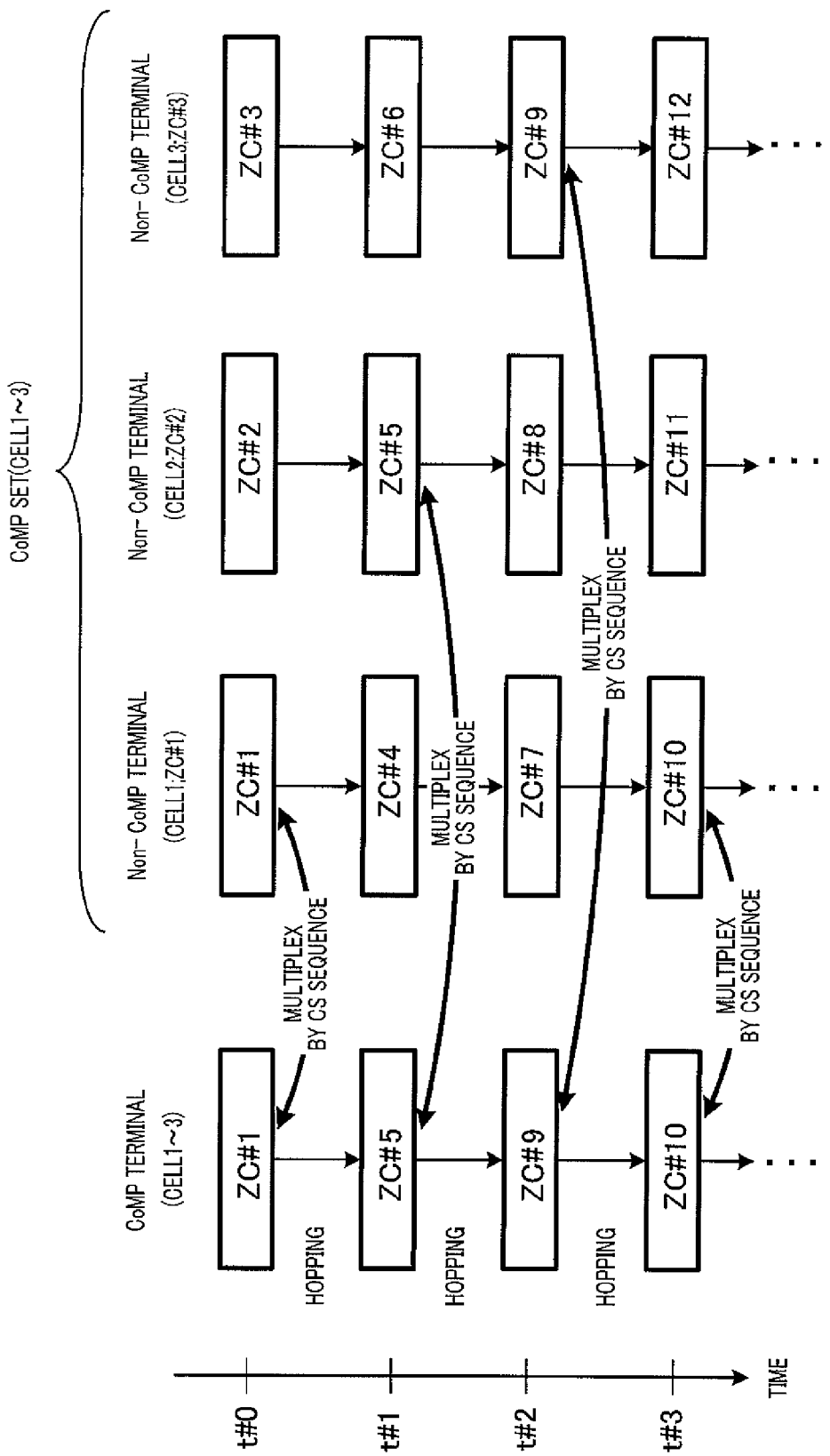
FIG. 9 shows other hopping pattern of ZC sequence numbers according to Embodiment 1 of the present invention.

Although the present embodiment has described a case where a ZC sequence assigned to a cell inside a CoMP set is fixed, a ZC sequence number assigned to a cell inside a CoMP set may be hopped, as shown in FIG. 9. However, in this case, it is necessary to make a hopping pattern of a ZC sequence number in a specific cell, different from a hopping pattern of a ZC sequence number used by a CoMP terminal.

By defining in advance a hopping pattern of a ZC sequence number for an SRS, the number used by a CoMP terminal, it is possible to reduce the signaling amount from a base station to a terminal. That is, an initial value ($=u_{N\_init}$) of each cell inside a CoMP set, and a hopping pattern of each cell (for example, in ascending cell number order) need to be reported to a terminal only once, and therefore signaling for each SRS transmission is not necessary.

Hopping patterns of ZC sequence numbers used by a CoMP terminal and a Non-CoMP terminal may not have regularity.

Embodiment 2

Since the configuration of a terminal according to Embodiment 2 of the present invention is similar to the configuration of Embodiment 1 shown in FIG. 4 and is different only in function of hopping pattern calculation section 104, so that hopping pattern calculation section 104 will be described using FIG. 4. Also, since the configuration of a base station to Embodiment 2 of the present invention is similar to the configuration of Embodiment 1 shown in FIG. 5, and is different only in function of hopping pattern calculation section 209, which is the same as hopping pattern calculation section 104 of a terminal, a detailed description will be therefore omitted.

According to whether terminal 100 is a CoMP terminal or a Non-CoMP terminal, hopping pattern calculation section 104 switches hopping patterns of ZC sequence numbers for an SRS, and specifies the ZC sequence number for an SRS which should be used at transmission timing.

When terminal 100 is a Non-CoMP terminal, as in Embodiment 1, hopping pattern calculation section 104 calculates ZC sequence number $u_N(t)$ for an SRS of a Non-CoMP terminal by equation 1.

Meanwhile, when terminal 100 is a CoMP terminal, hopping pattern calculation section 104 hops a ZC sequence number to be used by a Non-CoMP terminal outside a CoMP set. For example, when a CoMP set is formed with three cells of cell 1, cell 2, and cell 3, hopping pattern calculation section 104 calculates ZC sequence number $u_{CoMP}(t)$ for an SRS of a CoMP terminal as shown in equation 3.

$$u_{CoMP}(t) = u_{((t) \bmod (27) + 4)}(t) \quad \text{(Equation 3)}$$

In equation 3, 27 represents the number obtained by subtracting 3 which is the number of cells of a CoMP set, from 30 which is the number of all ZC sequence numbers available in the whole system, that is the number of ZC sequence number to be used outside a CoMP set. Here, transmission subframe number t is assumed to be changed in order of t#0→t#1→t#2→t#3→t#4. In this case, ZC sequence number $u_{CoMP}(t)$ for an SRS of a CoMP terminal, the number to be used at transmission timing of each transmission subframe becomes $u_4(0) \rightarrow u_5(1) \rightarrow u_6(2) \rightarrow u_7(3) \rightarrow u_8(4)$, according to equation 3. The change is made among ZC sequence numbers used outside a CoMP set.

Figure 10:
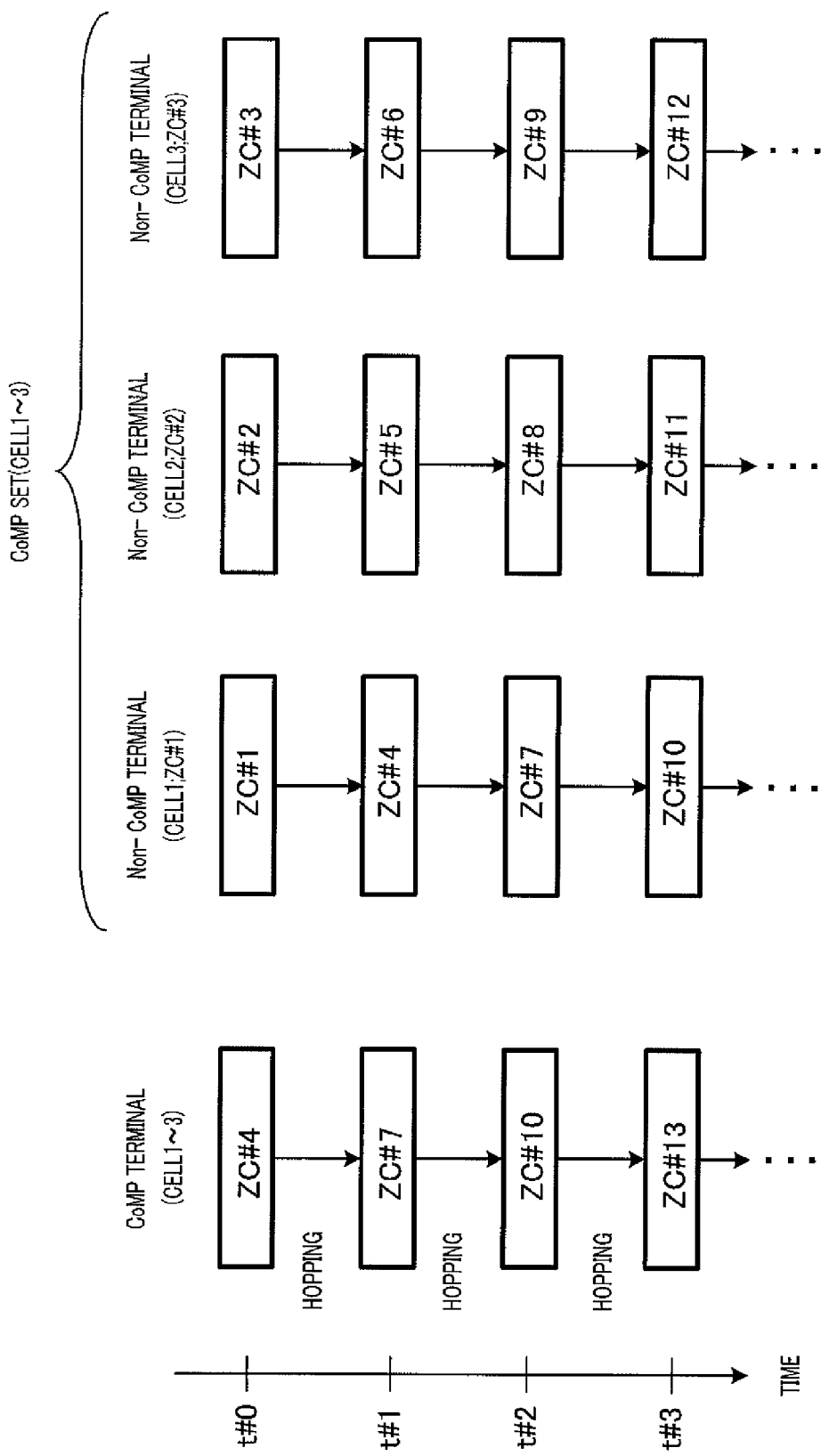
FIG. 10 shows a hopping pattern of ZC sequence numbers according to Embodiment 2 of the present invention.

FIG. 10 shows this state. In FIG. 10, at transmission timing when transmission subframe number t is t#0, a ZC sequence number for an SRS of a CoMP terminal uses ZC#4, ZC sequence number 1 (ZC#1) is assigned to cell 1 inside a CoMP set, ZC sequence number 2 (ZC#2) is assigned to cell 2, and ZC sequence number 3 (ZC#3) is assigned to cell 3, respectively.

Next, at transmission timing when transmission subframe number t changes from t#0 to t#1, a ZC sequence number for an SRS of a CoMP terminal hops from ZC#4 to ZC#7, cell 1 hops from ZC#1 to ZC#4, cell 2 hops from ZC#2 to ZC#5, and cell 3 hops from ZC#3 to ZC#6.

Next, at transmission timing when transmission subframe number t changes from t#1 to t#2, a ZC sequence number for an SRS of a CoMP terminal hops from ZC#7 to ZC#10, cell 1 hops from ZC#4 to ZC#7, cell 2 hops from ZC#5 to ZC#8, and cell 3 hops from ZC#6 to ZC#9.

Next, at transmission timing when transmission subframe number t changes from t#2 to t#3, a ZC sequence number for an SRS of a CoMP terminal hops from ZC#10 to ZC#13, cell 1 hops from ZC#7 to ZC#10, cell 2 hops from ZC#8 to ZC#11, and cell 3 hops from ZC#9 to ZC#12.

Thus, according to Embodiment 2, by hopping a ZC sequence number used by a CoMP terminal within the range of the ZC sequence to be used outside a CoMP set, a ZC sequence number for an SRS of a CoMP terminal and a ZC sequence number for an SRS of a Non-CoMP terminal always differ inside a CoMP set. Therefore, it is possible to prevent strong interference occurring in the case where a CoMP terminal and a Non-CoMP terminal use the same ZC sequence.

Also, a Non-CoMP terminal inside a CoMP set hops a ZC sequence number used by a CoMP terminal with a different pattern, and it is therefore possible to randomize interference between a Non-CoMP terminal outside a CoMP set, the Non-CoMP terminal using the same ZC sequence number as that inside a CoMP set and a Non-CoMP terminal inside a CoMP set, and thereby to reduce deterioration of the accuracy of CQI estimation caused by the interference.

Although the present embodiment has described a case where hopping patterns of ZC sequence numbers used by a CoMP terminal and a Non-CoMP terminal has regularity, these hopping patterns need not to have regularity.

Embodiment 3

Embodiment 3 of the present invention will describe a case where a certain cell includes a plurality of CoMP terminals and different CoMP sets include a plurality of CoMP terminals. In this case, by providing a hopping pattern of a ZC sequence number for an SRS to each CoMP terminal, a ZC sequence number for an SRS to each CoMP terminal in a cell differs. Therefore, it is not possible to make SRS used by a plurality of CoMP terminals orthogonal by CDM (code domain), and therefore the accuracy of CQI estimation deteriorates. By multiplexing SRSs for a plurality of CoMP terminals using TDM (time domain) or FDM (frequency domain), SRS orthogonality can prevent deterioration of the accuracy of CQI estimation, but a time for SRS transmission in a cell and overhead of frequency resource increase.

Hereinafter, in the case where a plurality of CoMP terminals are included in different CoMP sets, a method will be described to prevent deterioration of the accuracy of CQI estimation and reduce a time for SRS transmission in a cell and overhead of frequency resource.

The configuration of a terminal according to Embodiment 3 of the present invention is similar to the configuration shown in FIG. 4 of Embodiment 1 and differs only in function of ZC sequence number inside CoMP set setting section 102, and therefore the different functions thereof will be explained using FIG. 4. Also, since the configuration of a base station to Embodiment 3 of the present invention is similar to the configuration of Embodiment 1 shown in FIG. 5, and differs only in function of ZC sequence number inside CoMP set setting section 207, which is the same as ZC sequence number inside CoMP set setting section 207 of a terminal, a detailed description will be therefore omitted.

ZC sequence number inside CoMP set setting section 102 sets a ZC sequence number for an SRS, that is, the number to be used by all cells forming a CoMP set where a plurality of CoMP terminals present in a cell belong, and outputs the setting result to hopping pattern calculation section 104.

For example, it is assumed that two CoMP terminals 1 and 2 are present in a cell, the CoMP set where CoMP terminal 1 belongs is formed by cells 1 and 2, and the CoMP set where CoMP terminal 2 belongs is formed by cells 2 and 3. That is, it is assumed that CoMP sets differs in the configuration between CoMP terminals 1 and 2. In this case, ZC sequence number inside CoMP set setting section 102 sets all cells forming CoMP sets where a plurality of CoMP terminals belongs respectively, that is, a combining CoMP set formed by cells 1 to 3. Then, ZC sequence number inside CoMP set setting section 102 outputs ZC sequence numbers for SRSs of cells 1 to 3 to hopping pattern calculation section 104.

Figure 11:
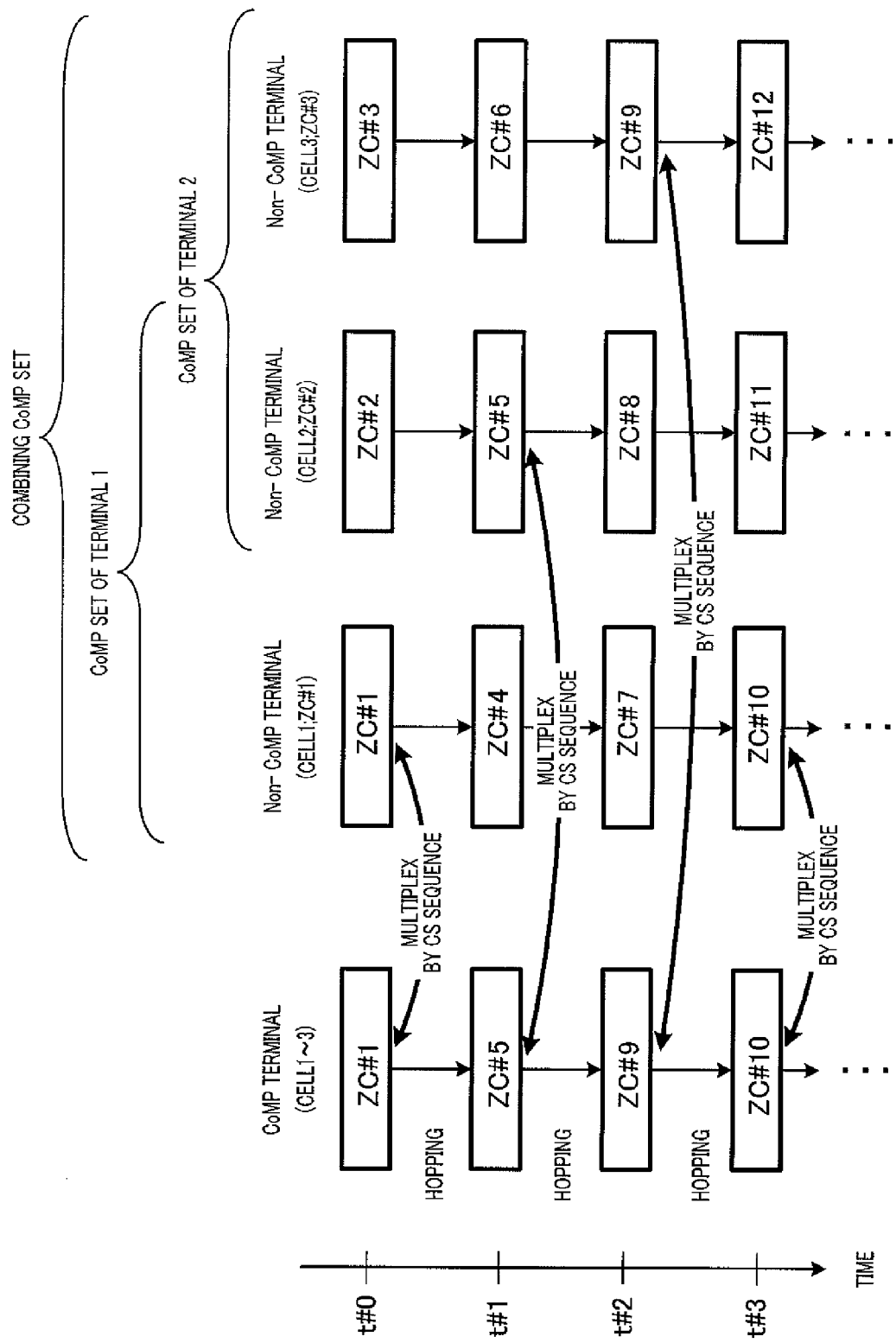
FIG. 11 shows a hopping pattern of ZC sequence numbers according to Embodiment 3 of the present invention.

FIG. 11 shows this state. Although FIG. 11 has the same hopping pattern as shown in FIG. 9, FIG. 11 differs from FIG. 9 in that two CoMP terminals 1 and 2 use the same ZC sequence. Also, FIG. 11 differs from FIG. 9 in that a CoMP set where CoMP terminal 1 belongs is formed by cells 1 and 2, a CoMP set where CoMP terminal 2 belongs is formed by cells 2 and 3, and ZC sequence numbers are hopped among all cells forming CoMP sets where a plurality of CoMP terminals belong.

Thus, according to Embodiment 3, in the case where a plurality of CoMP terminals present in a certain cell are included in different CoMP sets respectively, a ZC sequence number to be used by a CoMP terminal is hopped, within the range of the ZC sequence to be used by all cells forming CoMP sets where a plurality of CoMP terminals belong. Consequently, it is possible to make ZC sequence numbers used by a plurality of CoMP terminals present in a certain cell to be the same, and therefore CDM (code axis) can orthogonalize SRSs used by a plurality of CoMP terminals. Therefore, it is possible to prevent the accuracy of CQI estimation from deterioration. Also, there is no need to multiplex SRSs of a plurality of CoMP terminals in order to be orthogonal by TDM or FDM, so that it is possible to reduce a time for SRS transmission and overhead of frequency resource.

A CoMP set in the above embodiments can be referred to as "CoMP cooperating set." Also, a CoMP set may be a cell group (=CoMP measurement set) to which a terminal reports channel quality information for CoMP transmission and reception.

Although the above embodiments have described as an example an SRS transmitted by a terminal to which UL CoMP is applied, the present invention is not limited to this. For example, an SRS may be used for CSI (Channel State Information) feedback to perform adaptive control (resource assignment, MCS control, update of a precoding vector) of downlink CoMP in TDD (Time Division Duplex). Thus, the essential requirement is that one terminal transmits an SRS to a plurality of cells at the same time.

A ZC sequence number in the above embodiments may be replaced as "ZC sequence group number."

Although the above embodiments have described a case where a ZC sequence number of a CoMP terminal and a ZC sequence number of a Non-CoMP terminal are hopped at the same switching period, it is equally possible to hop such ZC sequences numbers at different switching periods. For example, it is assumed that a ZC sequence switching period of a Non-CoMP terminal is T1[ms] and a ZC sequence switching period of a CoMP terminal is T2[ms] (please note that T2[ms]>T1[ms], including that T2 is infinite (that is, no switching)).

By this means, inside a CoMP set, it is possible to prevent strong interference occurring when a CoMP terminal and a Non-CoMP terminal use the same ZC sequence from continuing in one cell. Here, when a switching period of a ZC sequence of one terminal is infinite, only a ZC sequence of the other terminal is switched, and therefore interference with a Non-CoMP terminal outside a CoMP set using the same ZC sequence number can be randomized.

Although the above embodiments have described an example where the present invention is implemented with hardware, the present invention can be implemented with software.

Furthermore, each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells in an LSI can be regenerated is also possible.

Further, if integrated circuit technology comes out to replace LSI's as a result of the advancement of semiconductor technology or a derivative other technology, it is naturally also possible to carry out function block integration using this technology. Application of biotechnology is also possible.

Although the present invention has been described above with embodiments using antennas, the present invention is equally applicable to antenna ports.

An antenna port refers to a theoretical antenna comprised of one or a plurality of physical antennas. Thus, an antenna port is not limited to mean one physical antenna, and may be for example an array antenna formed by multiple antennas.

For example, 3 GPP LTE does not define how many physical antennas an antenna port is formed with, but defines that an antenna port is the minimum unit for transmitting different reference signals in a base station.

In addition, an antenna port may be defined as a minimum unit for multiplying a precoding vector as weighting.

The disclosure of Japanese Patent Application No. 2009-250432, filed on Oct. 30, 2009, including the specification, drawings and abstract, is incorporated herein by reference in its entirety.

INDUSTRIAL APPLICABILITY

A radio communication apparatus and reference signal generation method of the present invention are applicable, for example, to a mobile communication system such as an LTE-Advanced system.

REFERENCE SIGNS LIST

101, 206 CoMP mode setting section
102, 207 ZC sequence number inside CoMP set setting section
103, 208 ZC sequence number in system setting section
104, 209 Hopping pattern calculation section
105, 210 ZC sequence generation section
106 Mapping section
107, 212 IFFT section
108 CP addition section
109 RF transmission section
110, 210 Antenna
202 RF reception section
203 CP removing section
204 FFT section
205 Demapping section
211 Division section
213 Masking processing section
214 DFT section
215 CQI estimation section

The invention claimed is:

1. An integrated circuit for controlling a process, the process comprising:
    calculating a sequence number using a hopping pattern that define a variation of sequence numbers over time, the hopping pattern being defined differently by whether a CoMP (Coordinated Multiple Point transmission and reception) mode or Non-CoMP mode is set, wherein, when the CoMP mode is set, a plurality of base stations or cells communicate with the radio communication apparatus in a coordinated manner between the plurality of base stations or cells; and
    generating a sequence used for a reference signal using the calculated sequence number.

2. The integrated circuit according to claim 1, comprising:
    circuitry which, in operation, controls the process;
    at least one input coupled to the circuitry, wherein the at least one input, in operation, inputs data; and
    at least one output coupled to the circuitry, wherein the at least one output, in operation, outputs data.

3. The integrated circuit according to claim 2, wherein the calculating includes calculating the sequence number by hopping a sequence number that is used in a CoMP set, the CoMP set comprising the plurality of base stations or cells performing communication in the coordinated manner, when the CoMP mode is set.

4. The integrated circuit according to claim 2, wherein the calculating includes calculating the sequence number by hopping a sequence number that is not used in a CoMP set, the CoMP set comprising the plurality of base stations or cells performing communication in the coordinated manner, when the CoMP mode is set.

5. The integrated circuit according to claim 2, wherein the calculating includes calculating the sequence number by hopping a sequence number that is used in CoMP sets in a cell, wherein each of the CoMP sets comprises a plurality of base stations or cells performing communication with a radio communication apparatus in the coordinated manner, when the CoMP mode is set.

6. The integrated circuit according to claim 2, wherein the calculating includes calculating the sequence number by hopping a sequence number that is not used in CoMP sets in a cell, wherein each of the CoMP sets comprises a plurality of base stations or cells performing communication with a radio communication apparatus in the coordinated manner, when the CoMP mode is set.

7. The integrated circuit according to claim 2, wherein the calculating includes calculating the sequence number using the hopping pattern, which is defined based on a cell identification number, when the Non-CoMP mode is set.

8. The integrated circuit according to claim 2, wherein the hopping pattern includes a first hopping pattern and a second hopping pattern different from the first hopping pattern, and the calculating includes calculating the sequence number using the first hopping pattern when the CoMP mode is set, and calculating the sequence number using the second hopping pattern when the Non-CoMP mode is set.

9. The integrated circuit according to claim 2, wherein when the CoMP mode is set, the process further comprises transmitting a signal to a plurality of cells capable of coordinating a reconstruction of a single signal based each of the plurality of signals received by the cells.

10. The integrated circuit according to claim 2, wherein the at least one output and the at least one input, in operation, are coupled to an antenna.

11. An integrated circuit comprising circuitry, which, in operation:
controls calculating of a sequence number using a hopping pattern that define a variation of sequence numbers over time, the hopping pattern being defined differently by whether a CoMP (Coordinated Multiple Point transmission and reception) mode or Non-CoMP mode is set, wherein, when the CoMP mode is set, a plurality of base stations or cells communicate with the radio communication apparatus in a coordinated manner between the plurality of base stations or cells; and
controls generating a sequence used for a reference signal using the calculated sequence number.

12. The integrated circuit according to claim 11, further comprising:
at least one input coupled to the circuitry, wherein the at least one input, in operation, inputs data; and
at least one output coupled to the circuitry, wherein the at least one output, in operation, outputs data.

13. The integrated circuit according to claim 12, wherein the calculating includes calculating the sequence number by hopping a sequence number that is used in a CoMP set, the CoMP set comprising the plurality of base stations or cells performing communication in the coordinated manner, when the CoMP mode is set.

14. The integrated circuit according to claim 12, wherein the calculating includes calculating the sequence number by hopping a sequence number that is not used in a CoMP set, the CoMP set comprising the plurality of base stations or cells performing communication in the coordinated manner, when the CoMP mode is set.

15. The integrated circuit according to claim 12, wherein the calculating includes calculating the sequence number by hopping a sequence number that is used in CoMP sets in a cell, wherein each of the CoMP sets comprises a plurality of base stations or cells performing communication with a radio communication apparatus in the coordinated manner, when the CoMP mode is set.

16. The integrated circuit according to claim 12, wherein the calculating includes calculating the sequence number by hopping a sequence number that is not used in CoMP sets in a cell, wherein each of the CoMP sets comprises a plurality of base stations or cells performing communication with a radio communication apparatus in the coordinated manner, when the CoMP mode is set.

17. The integrated circuit according to claim 12, wherein the calculating includes calculating the sequence number using the hopping pattern, which is defined based on a cell identification number, when the Non-CoMP mode is set.

18. The integrated circuit according to claim 12, wherein the hopping pattern includes a first hopping pattern and a second hopping pattern different from the first hopping pattern, and the calculating includes calculating the sequence number using the first hopping pattern when the CoMP mode is set, and calculating the sequence number using the second hopping pattern when the Non-CoMP mode is set.

19. The integrated circuit according to claim 12, wherein when the CoMP mode is set, the process further comprises transmitting a signal to a plurality of cells capable of coordinating a reconstruction of a single signal based each of the plurality of signals received by the cells.

20. The integrated circuit according to claim 12, wherein the at least one output and the at least one input, in operation, are coupled to an antenna.

* * * * *